US005216614A

United States Patent [19]

Kuchta et al.

[11] Patent Number: 5,216,614

[45] Date of Patent: Jun. 1, 1993

[54] APPARATUS AND METHOD FOR AUTOMATICALLY CUTTING A LENGTH OF SHEET WORK MATERIAL SEGMENT-BY-SEGMENT

[75] Inventors: Richard Kuchta, Tolland; Joseph R. Vivirito, South Windsor; Kevin A. Pearl, Manchester, all of Conn.

[73] Assignee: Gerber Garment Technology, Inc., Tolland, Conn.

[21] Appl. No.: 681,859

[22] Filed: Apr. 5, 1991

[51] Int. Cl.[5] .......................... G06F 15/46; B26F 1/38

[52] U.S. Cl. .............................. 364/470; 364/167.01; 83/49; 83/72

[58] Field of Search .................. 364/470, 469, 474.09, 364/167.01; 83/72, 74, 75, 49, 39

[56] References Cited

U.S. PATENT DOCUMENTS

| | | | |
|---|---|---|---|
| 3,761,675 | 9/1973 | Mason et al. | 219/121 LM |
| 3,769,488 | 10/1973 | Hasslinger | 219/121 LM |
| 4,178,820 | 12/1979 | Gerber | 83/13 |
| 4,327,615 | 5/1982 | Gerber et al. | 83/49 |
| 4,328,726 | 5/1982 | Pearl | 83/39 |
| 4,740,668 | 4/1988 | Perez | 219/121 PC |
| 4,972,745 | 11/1990 | Bruder et al. | 83/422 |

FOREIGN PATENT DOCUMENTS

| | | |
|---|---|---|
| 0315202 | 5/1989 | European Pat. Off. . |
| 2478340 | 9/1981 | France . |

*Primary Examiner*—Jerry Smith
*Assistant Examiner*—Paul Gordon
*Attorney, Agent, or Firm*—McCormick, Paulding & Huber

[57] ABSTRACT

In a machine and method for automatically cutting a length of sheet work material segment-by-segment to separate two dimensionally shaped pieces from it, registration between lines cut in adjacent segments is enhanced by the use of X and Y coordinate sensors carried by the X beam of the machine and having X and Y wheels respectively rotatably engaging the top surface of the work material to detect displacement changes between the X beam and the work material in the X and Y coordinate directions which detections are used to slave the advancement of the X beam to the advancement of the work material and to provide X and Y coordinate offset adjustments to the X and Y sets of control signals used to drive the cutter head in the X and Y coordinate directions during the cutting of the next segment of the work material.

7 Claims, 4 Drawing Sheets

APPARATUS AND METHOD FOR AUTOMATICALLY CUTTING A LENGTH OF SHEET WORK MATERIAL SEGMENT-BY-SEGMENT

FIELD OF THE INVENTION

This invention relates to an apparatus and method for automatically cutting a length of sheet work material, such as fabric for making clothing, upholstery, or the like, spread either as a single sheet or a lay-up of sheets on a supporting surface, wherein the work material is advanced by a conveyor mechanism to a cutting station segment-by-segment with the material being cut at the cutting station between advancements by a cutter head moveable in X and Y coordinate directions to cut pattern pieces or other two dimensional shapes from the work material, and deals more particularly with improvements in such apparatus and method and relating to moving the cutter head with the work material during an advancement and detecting and compensating for undesired displacements or position errors which may occur between the work material and parts of the cutting apparatus during an advancement.

BACKGROUND OF THE INVENTION

The method and apparatus of this invention are related to U.S. Pat. No. 4,328,726 entitled APPARATUS AND METHOD FOR WORKING ON SUCCESSIVE SEGMENTS OF SHEET MATERIAL and to copending U.S. patent application Ser. No. 07/571,074 filed Aug. 21, 1990 and entitled METHOD AND APPARATUS FOR ADVANCING SHEET MATERIAL FOR THE CUTTING OF SUCCESSIVE SEGMENTS THEREOF, which patent and copending application illustrate and describe various apparatus and methods for practicing the same general concept as involved in this application of automatically cutting a length of sheet work material segment-by-segment to produce two dimensional pattern pieces or the like. In such segment-by-segment cutting of work material it may happen that a given pattern piece has one portion falling into one segment and another portion falling into an adjacent segment, the first portion being cut while the first segment is at the cutting station and the second portion being cut while the adjacent segment is at the cutting station. It is highly desirable that each pattern piece be cut so as to be completely separated from the waste material, that is with no uncut threads or bridges of work material connecting the pattern piece to the waste material. This requires that the position of the work material relative to the parts of the cutting apparatus be precisely known for each segment of work material brought to the cutting station so that when a pattern piece is cut in two or more portions the beginning and ending points of one portion will precisely register with the beginning and ending points of the adjacent portion.

Since the work material is moved in one coordinate direction, that is the X coordinate direction extending parallel to its length, to advance it segment-by-segment to the cutting station, position errors may occur during each advancement which if uncorrected can lead to the lines cut in one segment not satisfactorily registering with the lines cut in the next adjacent segment. These position errors can arise, for example, because of the work material shifting its position relative to the supporting surface of the conveyor during an advancement, because of the conveyor not following a precisely straight path of movement, or because of the conveyor at the end of the advancement overshooting or undershooting its expected end position.

The general object of this invention is therefore to provide improved apparatus and methods for automatic segment-by-segment cutting of work material whereby good registration of the cutting occurring in adjacent segments of the work material is obtained.

In keeping with the foregoing object, a more detailed object of the invention is to provide an improved apparatus and methods for moving the X beam or carriage of the cutting apparatus in the X coordinate direction in unison with the work material during an advancement to reduce the likelihood of position errors occurring in the X coordinate direction between the work material and the parts of the cutting apparatus, and to provide improved apparatus and methods for detecting and compensating for whatever position errors do occur in either the X coordinate direction or in both the X coordinate direction and Y coordinate direction.

Other objects and advantages of the invention will be apparent from the following detailed description of a preferred embodiment and from the appended claims.

SUMMARY OF THE INVENTION

The invention resides in an apparatus and method for cutting sheet work material by automatic control with the material being advanced segment-by-segment to a cutting station where it is cut between such advancements by a cutter head moveable in X and Y coordinate directions, in combination with a sensor for detecting the displacement in the X coordinate direction between the top surface of the work material supported by the conveyor and the X beam, such sensor comprising an X rotary member carried by the X beam for rotation about an axis extending parallel to the Y coordinate direction and engagable with the top surface of the work material so as to be rotatable about said axis in the event of relative displacement between the work material and the X beam in the X coordinate direction, with the X rotary member having associated with it a rotary displacement to pulse converter supplying its output pulses to an X counter.

The invention further resides in using the content of the X counter to move the X beam of the cutting apparatus in unison with the work material during an advancement of the material, this being accomplished by determining, during the advancement, the difference between the starting count of the counter and the instantaneous count of the counter and using such difference as an error signal for a feedback drive system driving the X beam in the X coordinate direction.

The invention still further resides in the difference between the count of the counter at the start of an advancement and the count of the counter at the end of the advancement being taken to represent an X coordinate position error between the work material and the X beam and being used as an X coordinate offset adjustment for the marker data used by the controller to generate X and Y sets of control signals for driving the cutter head of the apparatus in the X and Y coordinate directions during the cutting of the new segment of work material then at the cutting station.

The invention still further resides in the provision of a Y rotary member carried by the X beam of the cutting apparatus and rotatable about an axis extending in the X coordinate direction, and an associated rotary displacement to pulse converter supplying its output pulses to a Y counter, with the difference between the count of the Y counter at the beginning and end of an advancement being taken to represent a position error in the Y coordinate direction and being used as a Y coordinate offset in generating from the marker data the X and Y control signals used to drive the cutter head in the X and Y coordinate directions to cut the new segment of work material then at the cutting station.

DETAILED DESCRIPTION OF THE PREFERRED EMBODIMENT

Figure 1:
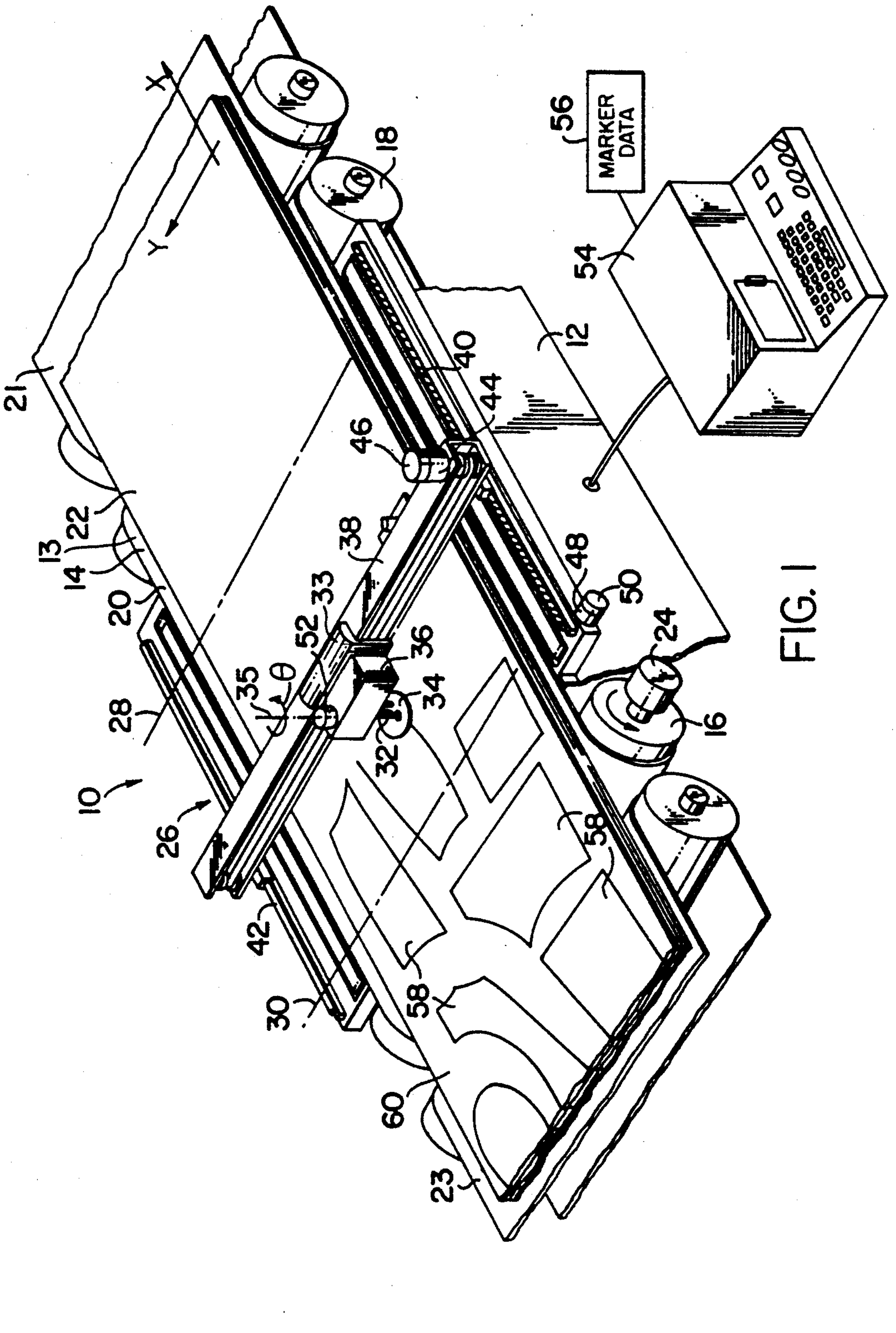
FIG. 1 is a perspective view of an automatic sheet material cutting apparatus embodying the invention.

Turning to FIG. 1, the invention is shown and described herein as embodied in an automatically controlled cutting machine 10 having a stationary frame 12 and a cutting station 26 fixed relative to the frame and of shorter length than the material 22 to be cut. For supporting the work material and advancing it to the cutting station the machine includes a conveyor 13 supported by the frame 12, the conveyor comprising an endless belt-like conveyor member 14 trained about rotatable end units 16 and 18. The conveyor member 14 may for example be of the type shown in U.S. Pat. No. 4,328,723 wherein the member is part of a cutting machine using vacuum to compress and hold the work material to the support surface and is made up of a large number of transversely extending bristle block carrying grids or slats pivotally connected to one another and wherein the end units 16 and 18 are of suitable sprocket-like shape for positive driving cooperation with the conveyor member. In any event, the conveyor member 14 provides, along its upper run, an upwardly facing supporting surface 20 for supporting a length of sheet work material 22 shown as a lay-up of a number of superimposed sheets. The forward unit 16 is powered by a drive motor 24 which rotates the unit in the counter-clockwise direction illustrated by the arrow to move the work material 22 along the illustrated X coordinate direction toward the left as viewed in FIG. 1.

Various different means may be used with the machine 10 for assisting in bringing work material to and taking it from the cutting station 26. In the illustrated cas of FIG. 1 these means include a feed conveyor 21 and a take-away conveyor 23 which may be of types well known in the art and which may be driven in unison with the conveyor member 14. In the alternative, the illustrated conveyor member 14 may be lengthened at either or both ends of the machine 10 to take the place of the separate feed conveyor 21 and/or the take-away conveyor 23.

The cutting station 26 has an effective range in the X coordinate direction defined by the limit lines 28 and 30, and has a range in the Y coordinate direction approximately equal to the width of the conveyor member 14. At the cutting station is a cutting tool 32 moveable in the X and Y coordinate directions over the full area of the cutting station to cut two dimensional lines in the segment of work material positioned at the cutting station.

The type of cutting tool used may vary widely without departing from the invention, but in the illustrated and presently preferred case it is a reciprocating knife cooperating with a presser foot 34 and reciprocated along a cutting axis 35 extending generally perpendicularly to the plane of the supporting surface 20. The cutting tool and the presser foot are part of a cutter head 36, in turn carried by a Y carriage 33. The Y carriage 33 is supported by an X beam or carriage 38 which extends over and across the cutting station 26. The X beam straddles the conveyor member 14 and at each of its opposite ends is supported by suitable longitudinally extending guides 40 and 42 for movement in the X coordinate direction relative to the frame 12. The Y carriage 33 is supported on the X beam 38 for movement in the illustrated Y coordinate direction perpendicularly to the X coordinate direction. A Y drive means including a motor 44 and a Y encoder 46 drives the Y carriage 33 and cutter head 36 in the Y coordinate direction relative to the X beam 38; and an X drive means including a motor 48 and an X encoder 50 drives the X beam 38 in the X coordinate direction.

Figure 2:
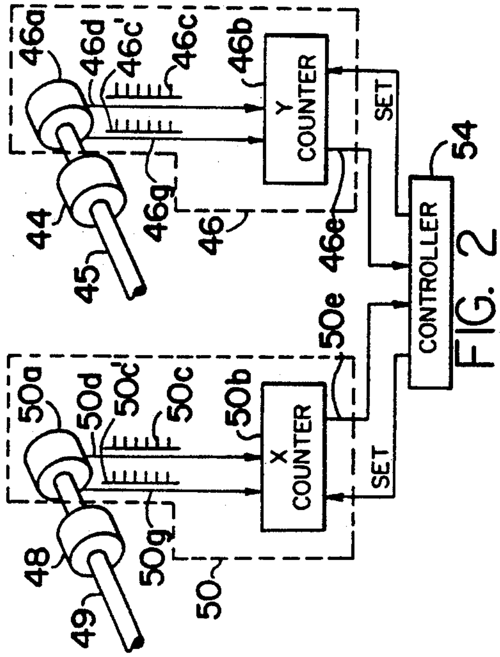
FIG. 2 is a schematic block diagram explaining the struction and operation of the encoders used in the machine of FIG. 1 with the drive motors for driving the cutter head in the X and Y coordinate directions relative to the frame.

Each of the encoders 46 and 50 is of a type which produces an output signal representing the instantaneous or actual position in the related coordinate axis of the cutter head 36, and which can be set to any desired starting value by the controller 54. Referring to FIG. 2, in the illustrated case the Y encoder 46 comprises a rotary displacement to pulse converter *46a* fixed to the output shaft 45 of the Y motor 44. In response to rotation of the shaft 45 the converter *46a* produces similar output pulses *46c* and *46c'* on two lines *46d* and *46g* with the appearance of each pulse indicating a fixed increment of displacement of the cutter head in the Y coordinate direction from the time of the last appearing pulse. The phase of the pulses appearing on one of the lines *46d* and *46g* relative to the pulses appearing on the other line constitutes a direction signal indicating the direction of rotation of the shaft 45. The pulses *46c* and *46c'* are supplied to a Y counter *46b* which is either counted up or down by the pulses depending on the direction of rotation indicated by the directional signal. The count of the counter *46b*, which appears on its output line 46e, therefore represents the instantaneous position of the Y carriage 33 relative to the frame 12 in the Y coordinate direction. The X encoder 50 is similar to the Y encoder 46 except that the rotary displacement to pulse converter *50a* is attached to the output shaft 49 of the X axis drive motor 48 thereby causing the X counter *50b* to have an output signal on the line *50e* representing the instantaneous position of the X beam 38 in the X coordinate direction relative to the frame 12. In FIG. 2 the Y counter *46b* and the X counter *50b* are for convenience shown separate from the controller 54, but, as is typically the case, these counters may in actuality be part of the controller 54.

Figure 3:
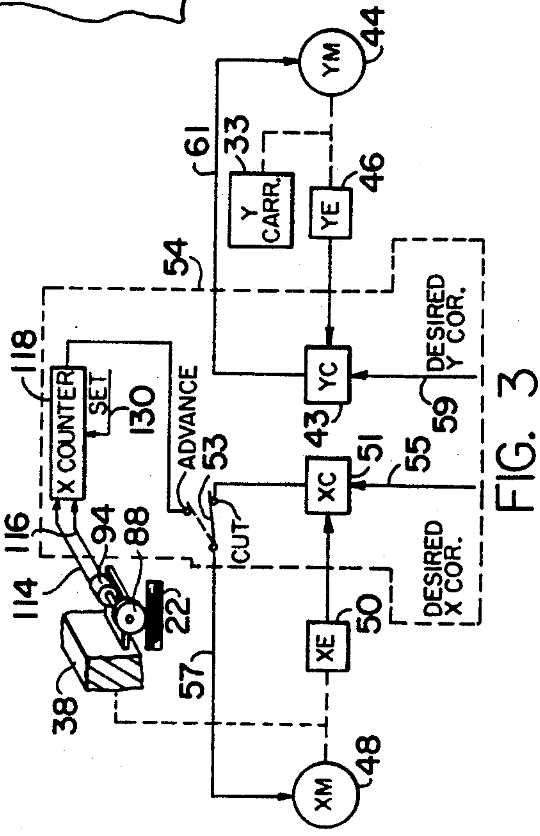
FIG. 3 is a schematic block diagram showing the feedback control circuit associated with each of the X and Y drive motors used in the machine of FIG. 1 for driving the cutter head in the X and Y coordinate directions.

The cutter head 36 during the cutting of a segment of work material at the cutting station 26 is driven in each coordinate axis by a feedback control or positioning circuit using the drive motor 44 or 48 and encoder 46 or 50 assigned to that axis. This system is shown in FIG. 3. Referring to this figure, during a cutting procedure the illustrated switch 53, which is internal to the controller 54, is in the "cut" position shown by the full lines. The feedback circuit for the X axis in addition to the X drive motor 48 and the X encoder 50 includes an X comparator 51. Likewise the feedback control system for the Y axis in addition to the Y drive motor 44 and the Y encoder 46 includes a Y comparator 43. Preferably the comparator functions are provided by the controller 54. In the operation of the system when the cutter head is to be driven to a new point the controller 54, of which the comparators 51 and 43 are a part, provides the desired X and Y coordinates of the new point. The desired X coordinate appears on a line 55 and is supplied to the X comparator 51. The comparator compares this desired X coordinate with the actual X coordinate of the cutter head 36 supplied by the X encoder 50. If the desired and actual X coordinates do not agree the comparator provides an error signal transmitted to the X motor 48 over the line 57 causing the X motor 48 to be operated to drive the X beam 38 in the X coordinate direction toward the desired X coordinate position dictated by the signal appearing on the line 55. Similarly the desired Y coordinate appears on the line 59 and is supplied to the Y comparator 43. This comparator compares the desired Y coordinate with the actual Y coordinate of the Y carriage 33 as supplied by the encoder 46, and if these two coordinate values do not agree an error signal is produced on the line 61 actuating the Y motor 44 to drive the cutter 36 in the Y coordinate direction toward the desired Y coordinate.

A reciprocating motor (not shown) in the cutter head drives the cutting tool 32 (FIG. 1) in its reciprocating motion, and another motor (not shown) rotates the cutting tool, under control of the controller 54, in the $\theta$ direction about the axis 35 to keep the tool facing forwardly along the line of cut. A solenoid 52 carried by the cutter head 36 is operable to move the cutter head frame, and therewith the cutting tool 32 and the presser foot 34, between a lowered position at which the cutting tool is in cutting engagement with the material 22 and a raised position at which the tool is out of cutting engagement with the material 22.

The computer implemented controller 54 supplies the necessary control signals to the machine to operate the X and Y motors 48 and 44, the solenoid 52 and other parts of the machine so that the tool 32 is moved along desired lines of cut relative to the work material 22 positioned at the cutting station 26. The desired lines of cut and other information are provided by marker data, indicated representationally at 56, processed by the controller 54 to yield the actual control signals, such as the X and Y coordinates of the successive points to which the cutter head is to be moved, used to operate the machine 10. A method and system for producing such marker data is, for example, described in U.S. Pat. No. 3,887,903. The data may be supplied either on line directly to a memory in the controller 54 or may be supplied to the controller pre-recorded on a tape, disc or In the operation of the machine 10, after a segment of the work material is positioned at the work station 2 the cutting tool is moved in the X and Y coordinate directions to cut lines in such segment, such lines usually being the peripheries of desired pattern pieces 58. After the segment is fully cut the cutting operation is interrupted, the drive motor 24 is operated to bring the next succeeding segment of work material to the work station and then the cutting tool 32 is operated again to cut lines in the fresh segment. Such segment-by-segment cutting is continued until all of the desired pattern pieces have been cut.

Following the cutting of pattern pieces by the cutting tool 32 the pattern pieces are removed from the adjacent waste material 60 either by picking.up the cut pattern pieces by hand or by using a mechanical separating means. To facilitate this separation it is essential that the pattern pieces be cleanly cut and separated from the waste material with there being no uncut fibers, strings or bridges connecting the pattern pieces to the waste material.

Figure 4:
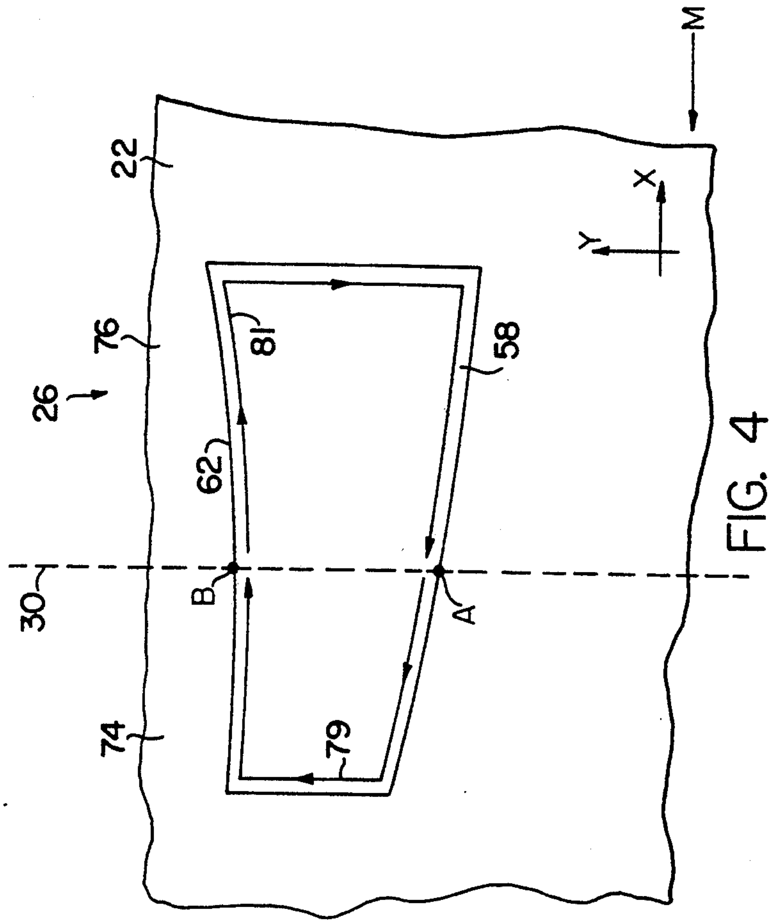
FIG. 4 is a fragmentary plan view showing the cutting of a pattern piece from work material by the machine of FIG. 1.

A situation in which non-clean or irregular cutting tends to occur is when a pattern piece to be cut from the work material has one portion falling in one segment and another portion falling in a following segment. Such a situation is shown, for example, in FIG. 4. In that figure, the illustrated pattern piece 58 has one portion located in a first segment 74 of the work material 22 and another portion looated in the following or second segment 76 of the work material. In conventional cutting of the illustrated pattern piece the portion located in the segment 74 is cut while that segment is located at the cutting station 26 with the tool being inserted into the material at point A and moved in cutting engagement with the material to the point B in the clockwise direction indicated generally by the arrow 79. At the point B the tool is removed from cutting engagement with the material and may be used, if necessary, to cut other lines appearing in the segment 74 while that segment is still at the cutting station 26. When all of the lines in the first segment 74 have been cut the material is advanced in the X coordinate direction, toward the left as indicated by the arrow M, relative to the machine frame, by operation of the conveyor element 14, to bring the second segment 76 to the cutting station. At some time while the second segment 76 is at the cutting station the cutting of the illustrated pattern piece 58 is completed by re-engaging the cutting tool with the material at the point B and cutting along the remainder of its peripheral line 62 by moving the tool from the point B to the point A along the path indicated generally by the arrow 81.

Because of accidental distortion or shifting of the work material relative to the supporting surface 20 of the conveyor element 14 during its advancement to bring the second segment to the work station, errors in the positioning of the conveyor element 14 at the end of the advancement, unintended shifting of the conveyor element 14 relative to the machine frame, or other reasons, the position of the cutter head relative to the work material at the end of the advancement may not be exactly represented by the encoders 46 and 50, so that using the outputs of those encoders to represent such position may cause cutting errors. To overcome or minimize this problem, and in accordance with the invention, when the work material 22 is moved relative to the machine frame by the conveyor 14 to bring a fresh segment of it to the cutting station, the X beam 38 is moved in unison with the movement of the work material during the advancement of the work material to inhibit the introduction of position errors, and position errors which do occur are detected at the end of the advancement and are combined with the marker data 56 by the controller 54 to provide X and Y sets of control signals supplied to the X and Y motors, the detected X and Y errors, if any, being used as X and Y coordinate offsets.

Figure 5:
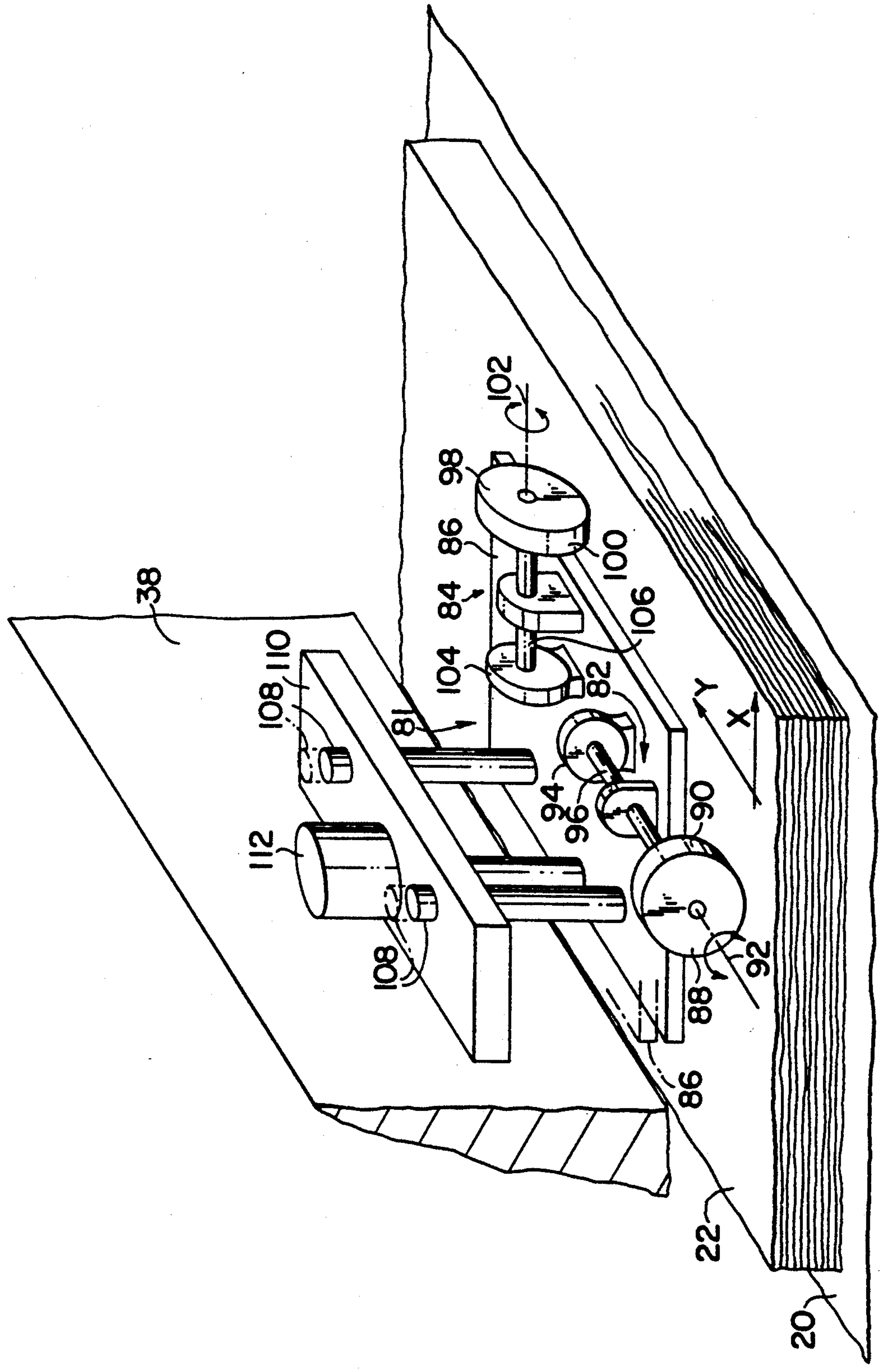
FIG. 5 is a perspective, somewhat schematic view of the X and Y sensors of the machine of FIG. 1 used to determine the X and Y displacements between the work material and the X beam of the cutting apparatus.
Figure 6:
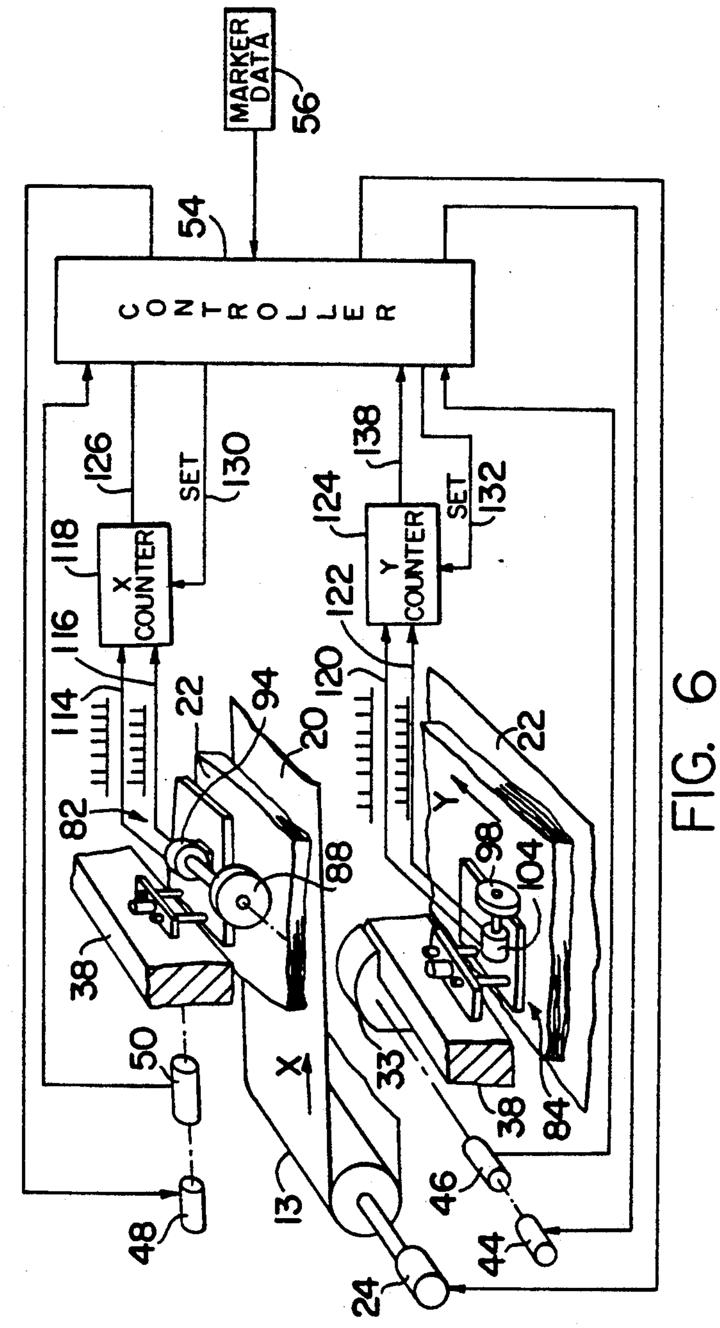
FIG. 6 is a schematic view showing the relationship between the X and Y sensors of FIG. 5 and other parts of the machine of FIG. 1.

Reference is now made to FIGS. 5 and 6 for further details of the apparatus and method provided by the invention to improve the cutting accuracy of the machine 10 particularly with regard to the registration of lines cut in one segment of the work material with lines cut in the succeeding segment. As shown in these figures, carried by the X beam 38 is a displacement sensing device 81 having both an X sensor indicated generally at 82 and a Y sensor indicated generally at 84 for detecting displacements in the X and Y coordinate directions respectively of the top surface of the work material 22 relative to the X beam 38. The two sensors 82 and 84 may be separately mounted to the X beam 38, but preferably and as shown they are carried by a single mounting member such as the illustrated plate 86.

The X sensor 82 of FIG. 5 includes a rotary member in the form of an X wheel 88 having a circular circumferential surface 90 engagable with the top surface of the work material 22 so that movement of the work material relative to the X beam 38 in the X coordinate direction will cause rotation of the wheel 88 in one direction about its axis 92 which is arranged parallel to the Y coordinate direction. Associated with the X wheel 88 is an angular rotation to pulse converter 94 rotatably drivingly connected with the wheel 88 by a shaft 96. The converter 94 is of well known conventional construction and produces similar output pulses on lines 114 and 116 each indicating a fixed increment of angular displacement of the X wheel 88 about the axis 92 from the time of the preceding pulse, and it also produces a directional signal, constituting a difference in phase between the pulses on the lines 114 and 116, indicating the direction of rotation of the wheel 88 about the axis 92.

The Y sensor 84 as shown in FIG. 5 is generally similar to the X sensor 82 and includes a Y rotary member in the form of a wheel 98 having a circular circumferential surface 100 engagable with the top surface of the work material 22 with the wheel being rotatable about an axis 102 extending parallel to the X coordinate direction. The Y wheel 98 has associated with it a rotary displacement to pulse converter 104 similar to the converter 94 and drivingly connected with the wheel 98 through a shaft 106.

As also shown in FIG. 5, the mounting plate 86 for the two sensors 82 and 84 is moveable vertically relative to the X beam 38 between the illustrated full line and broken line positions to allow it to be lowered and raised relative to the beam 38 to bring the X and Y wheels 88 and 98 into and out of engagement with the top surface of the material 22. This raising and lowering means for the mounting plate 86 may take many different forms and in the illustrated case is shown to consist of two vertical guide rods 108 fixed to the mounting plate 86 and guided for sliding vertical movement by a bracket 110 fixed to the X beam 38 and through which the guide rods 108 extend. The bracket 110 carries a suitable motor 112, which may for example be a pneumatic actuator, interconnected between the bracket 110 and the mounting plate 86 for effecting the raising and lowering movement of the mounting plate 86 relative to the X beam 38.

Referring to FIG. 6, wherein for convenience of illustration the X and Y sensors 82 and 84 are shown separately from one another, the output pulses and directional signal, appearing on the lines 114 and 116, of the converter 94 are supplied to an X counter 118 and the output pulses and the directional signal, appearing on the lines 120 and 122, of the converter 104 are supplied to a Y counter 124. Each of the counters 118 and 124 operates to have its content counted up or down by the pulses received from the associated converter 94 or 104 depending on the sense of the direction of rotation signal received from the same converter. The content of each counter is supplied to the controller 54 over a line 126 or 128 and the content of each counter may be set to zero by the controller 54 by a signal supplied over the line 130 or 132. Although in FIG. 6 the counters 118 and 124 are shown separate from the controller 54 they may be and preferably are provided by parts included in the controller 54.

The operation of the sensors 82 and 84 in combination with the other parts of the cutting apparatus is as follows. Just before the start of an advancement of the work material 22 by the conveyor 13 to bring a new segment of it to the cutting station the X beam 38 is moved, if not already there, to a position near the end of the cutting station represented by the line 28 of FIG. 1. The mounting plate 86 carrying the sensors 82 and 84 is then lowered relative to the X beam 38 to bring the wheels 88 and 98 of the sensors into engagement with the top surface of the work material 22. The controller 54 then operates the drive motor 24 of the conveyor 13 to advance the top run of the conveyor member 14 and the work material supported thereby toward the left in FIG. 1. Preferably this advancement occurs at a low acceleration rate with minimal jerking of the conveyor member and work material, and as the advancement nears its end the speed of the conveyor member and work material is smoothly and continuously reduced until a reduction in speed of an order of magnitude or more is reached and then the conveyor member and work material creep at a slow speed to the final end position. During this advancement of the work material by the conveyor member 14, the X beam 38 is slaved, through the use of the X sensor 82, to move in unison in the X coordinate direction with the work material.

The slaving of the X beam advancement to the advancement of the work material may be understood by reference to FIG. 2. Just before the beginning of the advancement the illustrated switch 53 of FIG. 3 is switched to the "advance" position shown by the broken lines. Then, after the advancement of the material begins any pulses produced by the converter 94 and counted by the counter 118 represent an X beam-to-work material displacement signal in the X coordinate direction which is used as an error signal supplied over the line 57 to the X motor 48 as part of a feedback drive system whereby the motor 48 tends to drive the X beam 38 to null such error signal. The error signal supplied to the line 57 could be obtained by having the controller 54 obtain and retain in memory the count of the counter 118 at the start of the advancement and then at repetitive times during the advancement having the controller compare this stored starting count with the instantaneous count of the counter and using the difference obtained by the comparison as the error signal. Preferably however, just before the start of the advancement the count of the counter is set to zero by an appropriate signal supplied over the line 130 so that thereafter, during the advancement, the count of the counter itself is equal to the difference between the starting count and the instantaneous count and can be used directly as the error signal, as illustrated in FIG. 2.

Despite the slaving of the advancement of the X beam 38 to the advancement of the work material as described above, at the end of the advancement some displacement error in the X coordinate direction between the X beam 38 and the work material 22 may still exist and be represented by a count in the counter 118. This error, if present, is then taken into account and compensated for by combining the count of the counter 118, representing an X beam-to-work material displacement signal in the X coordinate direction, with the marker data as an X coordinate offset adjustment to provide the set of X axis control signals and the set of Y axis control signals used to move the X beam 38 in the X coordinate direction by the motor 48 and to move the Y carriage in the Y coordinate direction by the motor 44 during the cutting of the new segment of work material then at the cutting station.

During the movement of the work material to bring a new segment of it to the cutting station as above described, some position errors may also occur in the Y coordinate direction. These errors are detected by setting the Y counter 124 to zero, by an appropriate signal supplied over the line 132, just before the start of the advancement so that position errors which do accumulate in the Y coordinate direction during the advancement are, at the end of the advancement, represented by the count of the Y counter 124 which therefore constitutes an X beam-to-work material displacement signal in the Y coordinate direction, This count is then taken by the controller 54 and combined with the marker data 56 as a Y coordinate offset adjustment to provide the set of X axis control signals and the set of Y axis control signals used in the cutting of the segment of work material then at the cutting station.

During the cutting of the new segment, and any other segment, of the work material 22 at the cutting station the switch 53 of FIG. 3 is maintained in its "cut" position and the mounting plate 86 is held in a raised position to disengage the sensor wheels 88 and 98 from the work material.

Since the advancement of the work material occurs in the X coordinate direction, most of the position errors may tend to occur in this direction, and if desired the X axis sensor 82 may in some applications be used alone without the Y axis sensor 84. Also, the X axis sensor 82 need not necessarily, in keeping with the broader aspects of the invention, be used to both slave the advancement of the Y beam to the advancement of the work material and to detect the position errors remaining at the end of an advancement, but may instead by used for only either one of these functions separately from the other.

It should also be noted that in the illustrated embodiment the X and Y sensors 82 and 84 are shown to be carried by the X beam 38 by having the bracket 110 connected directly to the X beam, but this is not essential and if desired the sensors may be carried by the X beam through the Y carriage 33 as, for example, by having the bracket 110 connected to the Y carriage 33 rather than directly to the X beam 38.

We claim:

1. A sheet work material cutting apparatus whereby a length of sheet work material to be cut is advanced segment-by-segment to a cutting station where it is cut between such advancements by a cutter head moveable in X and Y coordinate directions, said apparatus comprising:

a frame, a conveyor mechanism carried by said frame providing an upwardly facing surface for supporting sheet work material to be cut at a cutting station fixed relative to said frame and which supporting surface is moveable in an X coordinate direction relative to said frame to advance said work material segment-by-segment to said cutting station, an X beam extending across said cutting station in a Y coordinate direction perpendicular to said X coordinate direction and supported by said frame for movement relative to said frame in said X coordinate direction, an X beam drive means for driving said X beam in said X coordinate direction, a Y carriage mounted on said X beam for movement relative to said X beam in said Y coordinate direction, a Y carriage drive means for driving said Y beam in said Y coordinate direction, a cutter head carried by said Y carriage for cutting lines in work material supported by said supporting surface at said work station as it is moved along such lines by coodinated movement of said X beam and said Y carriage in said X and Y coordinate directions respectively, a displacement sensing device carried by said X beam for sensing the displacement of said X beam relative to the work material supported by said supporting surface and for supplying an X beam-to-work material displacement signal related to said displacement, said displacement sensin device including at least one rotary member having a surface engagable with the top surface of the work material supported by said supporting surface of said conveyor mechanism so as to be rotated in the event of a change in the displacement of said work material relative to said X beam, and means responsive to said rotation of said at least one rotary member for producing said X beam-to-work material displacement signal, said displacement sensing device further being one whereby said X beam-to-work material displacement signal supplied by it includes a first signal representing the displacement of said X beam relative to said work material in said X coordinate direction and a second signal representing the displacement of said work material relative to said X beam in said Y coordinate direction, and conveyor drive means for driving said conveyor mechanism to move said supporting surface and the work material supported thereby in said X coordinate direction to advance a new segment of said work material to said cutting station while said at least one rotary member of said displacement sensing element remains in engagement with said top surface of said work material, whereby said displacement sensing device produces said X beam-to-work material displacement signal as said conveyor drive means advances said work material.

2. A sheet work material cutting apparatus as defined in claim 1 further characterized by:

a means associated with one of said X beam drive means and conveyor drive means and using said first signal as a signal for causign said X beam and said conveyor mechanism to be moved by said X beam drive means and said conveyor drive means in said X coordinate direction in unison with one another during the advancement of a new segment of said work material to said work station, means providing marker data defining by points described in terms of X and Y coordinates the shapes of pieces to be cut from said work material, means including a computerized controller operable between advancements of said work material by said conveyor mechanism and responsive to said marker data for controllably mvoing said X beam in said X coordinate direction relative to said frame and said Y carriage in said Y coordinate direction relative to said X beam to cut pieces from said work material corresponding in shape to the pieces defined by said marker data, and said controller being operable to use the first and second signals from said displacement sensing device appearing at the end of said advancement of a new segment of said work material to said cutting station to provide X and Y coordinate offset adjustments, respectively, to said marker data in the subsequent cutting of the new segment of work material positioned at said cutting station.

3. A sheet work material cutting apparatus as defined in claim 2 further characterized by:

said displacement sensing device including X and Y rotary members rotatable respectively about axes extending parallel to said Y and X coordinate directions, X and Y rotary displacement to pulse converters connected respectively to said X and Y rotary members, X and Y counters associated respectively with said X and Y converters and each operable to be counted up or down by the pulses of the associated converter depending on the direction of rotation of the associated rotary member, and X and Y means associated respectively with said X and Y counters for determining for each counter the difference between a given count and the instantaneous count of the counter which difference constitutes the associated one of said first and second signals.

4. A sheet work material cutting apparatus as defined in claim 3 further characterized by:

said means associated with each of said X and Y counters for determining the difference between a given count and the instantaneous count being a means for setting the count of the counter to zero at the start of an advancement of said work material so that during and at the end of said advancement said first and second signals are respectively the counts of said X and Y counters.

5. A sheet work material cutting apparatus as defined in claim 3 further characterized by said X and Y rotary members both being carried by a common mounting member which mounting member is moveable vertically relative to said X beam to bring said X and Y rotary members into and out of engagement with said top surface of said work material.

6. A method for cutting sheet work material comprising the steps of:

providing a frame, providing a conveyor mechanism carried by said frame and having an upwardly facing surface for supporting sheet work material to be cut at a cutting station fixed relative to said frame and which supporting surface is moveable in an X coordinate direction relative to said frame to advance said work material segment-by-segment to said cutting station, providing a conveyor drive means for driving said conveyor mechanism, providing an X beam extending across said cutting station in a Y coordinate direction perpendicular to said X coordinate direction and supported by said frame for movement relative to said frame in said X coordinate direction, providing an X beam drive means for driving said X beam in said X coordinate direction, providing a Y carriage mounted on said X beam for movement relative to said X beam in said Y coordinate direction, providing a Y carriage drive means for driving said Y carriage in said Y coordinate direction, providing a cutter head carried by said Y carriage for cutting lines in work material supported by said supporting surface at said cutting station as it is moved along such lines by coordinated movement of said beam and said Y carriage in said X and Y coordinate directions respectively, providing marker data defining in terms of points described by X and Y coordinates the shapes of pieces to be cut from said work material supported on said supporting surface of said conveyor, cutting the segment of work material at said work station in accordance with said marker data, operating said conveyor drive means to drive said conveyor mechanism to advance a new segment of work material to said work station, providing an X rotary member carried by said X beam and rotatable about a first axis extending parallel to said Y coordinate direciton and having a surface engagable with the top surface of the work material supported by said supporting surface of said conveyor mechanism so as to be rotated about said first axis in one direction or the other in the event of a change in the displacement in said X coordinate direction of said work material relative to said X beam, providing an X rotary displacement to pulse converter drivingly connected with said rotary member and operable to produce output pulses each indicating a fixed increment of angular rotation of said rotary member about said first axis from the time of the preceding pulse and to also produce an X directional signal indicating the direction of rotation of said rotary member about said first axis, providing an X counter receiving said pulses and said directional signal from said X rotary displacement to pulse converter and operable to have its content counted up or down by said pulses depending on the direction of rotation indicated by said X directional signal, providing a Y rotary member carried by said X beam and rotatable about a second axis extending parallel to said X coordinate direciton and having a surface engagable with the top surface of the work material supported by said supporting surface of said conveyor mechanism so as to be rotated about said second axis in one direction or the other in the event of a change in the displacement in said Y coordinate direction of said work material relative to said X beam, providing a Y rotary displacement to pulse converter drivingly connected to said Y rotary member and operable to produce output pulses each indicating a fixed increment of angular rotation of said Y rotary member about said second axis from the time of the preceding pulse and to also produce a Y directional signal indicating the direction of rotation of said Y rotary member about said second axis, providing a Y counter receiving said pulses and said directional signal from said Y rotary displacement to pulse converter and operable to have its content counted up or down by said pulses depending on the direction of rotation indicated by said Y directional signal, throughout said advancement engaging said X rotary member and said Y rotary member with the top surface of said work material and repeatedly determining the X difference between the count of said X counter at the start of said advancement and the instantaneous count of said counter, using said X difference as a signal for causing said X beam drive means and said conveyor drive means to drive said X beam and said conveyor mechanism in unison with one anotehr during said advancement, terminating the operation of said conveyor drive means at the end of said advancement, after said termination of the operation of said conveyor drive means determining said X difference and said Y difference, and then cutting said new segment of work material in accordance with said marker data using said X difference and said Y difference to provide X and Y coordinate offset adjustments to said marker data.

7. The method defined in claim 6 further characterized by:

said steps of determining said X difference and of determining said Y difference being carried out by setting both of said X and Y counters to zero before the start of said advancement so that the counts of said counters represent said X difference and said Y difference, respectively, during and at the end of said advancement.

* * * * *